INFRARED SPECTRA OF LINCOMYCIN B FREE BASE

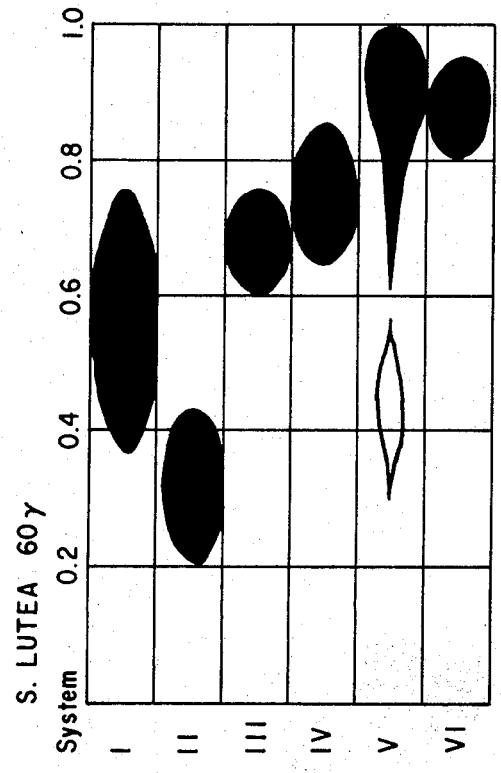

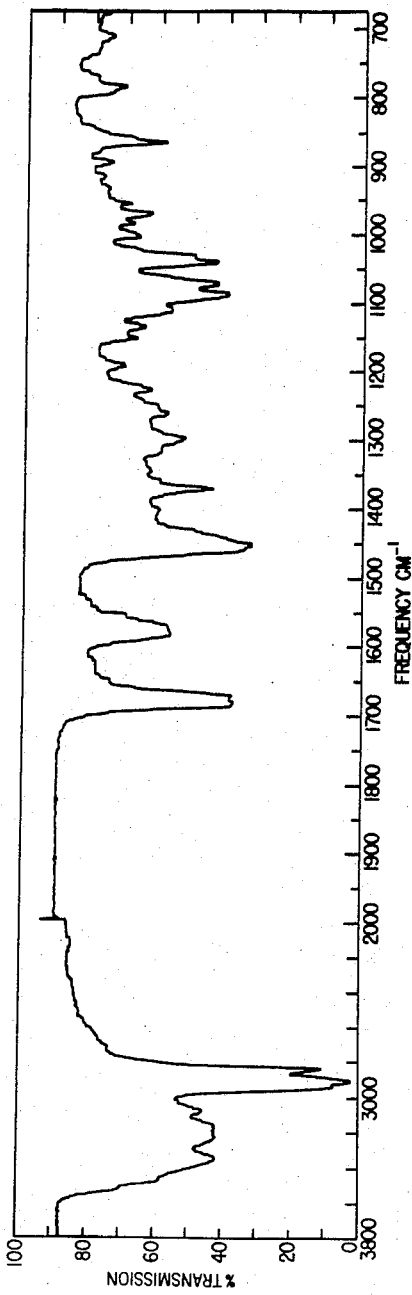

United States Patent Office 3,359,164
Patented Dec. 19, 1967

3,359,164
ANTIBIOTIC LINCOMYCIN B AND PROCESS FOR PREPARING THE SAME
Alexander D. Argoudelis, Kalamazoo, John A. Fox, Texas Township, Kalamazoo County, and Malcolm E. Bergy, Kalamazoo, Mich., assignors to The Upjohn Company, Kalamazoo, Mich., a corporation of Delaware
Filed Mar. 25, 1964, Ser. No. 354,688
7 Claims. (Cl. 167—65)

ABSTRACT OF THE DISCLOSURE

Antibiotic lincomycin B, a nitrogenous base having the molecular formula $C_{17}H_{32}N_2O_6S$, is produced microbiologically by the microorganism *Streptomyces lincolnensis* var. *lincolnensis*. Lincomycin B inhibits the growth of *Staphylococcus aureus* and can be used as a disinfectant for washed and stacked food utensils contaminated with this organism.

---

Figure 1:
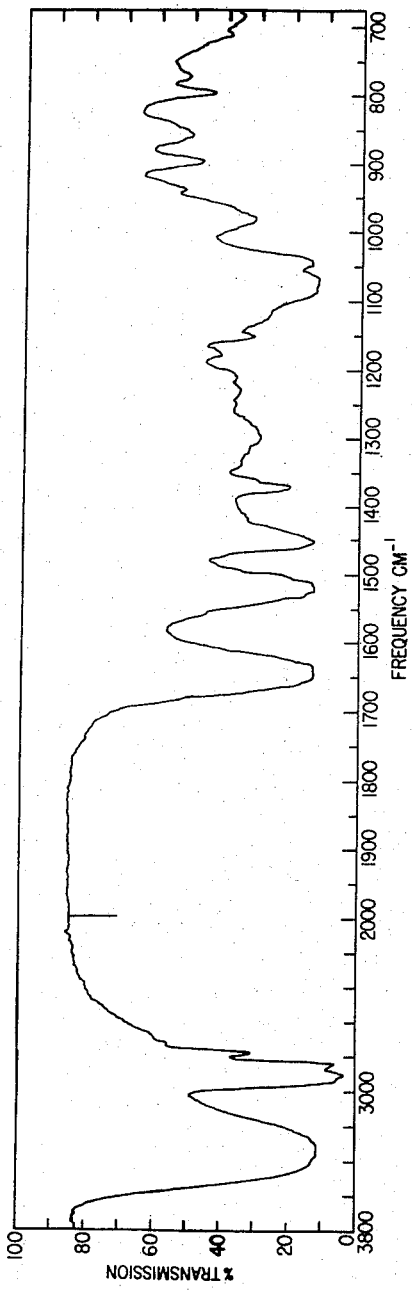

This invention relates to a novel composition of matter and to a process for the production thereof. More particularly this invention relates to a new compound, lincomycin B (U-21699) and to a process for the preparation thereof.

In U.S. Patent 3,086,912 there is described a fermentation and recovery process for the production of the antibiotic lincomycin, also called lincolnensin. The present invention is based on the discovery that preparations of crude lincomycin contain a hitherto unknown antibiotic material. This antibiotic material, which is named lincomycin B, has the same spectrum of sensitive organisms such as lincomycin, though in a lesser degree. Therefore, it can be used in the same manner as lincomycin. For example, it is useful in wash solutions for sanitation purposes, as in the washing of hands and the cleaning of equipment, floors, or furnishings of contaminated rooms; it is also useful as an industrial preservative, for example, as a bacteriostatic rinse for laundered clothes and for impregnating paper and fabrics; and it is useful for suppressing the growth of sensitive organisms in plate assays, and other biological media. It can also be used as a feed supplement to promote the growth of mammals and birds, either alone or in combination with antibiotics.

Lincomycin and lincomycin B are similar in many respects; for example, both antibiotics have one basic titratable group with similar pKa' values and very close equivalent weights, both antibiotics show no absorption in the UV region, and both have the same solubility properties. However, these antibiotics are distinctly different as shown by thin-layer chromatography using a solvent system consisting of methyl ethyl ketone, acetone, water (150:50:20).

Procedures such as counter-current distribution and Florisil chromatography (a synthetic silicate of the type described in U.S. Patent 2,393,625 and sold by the Floridin Company) were employed to isolate quantities of lincomycin B from crude preparations.

The novel compound of the invention is produced in a fermentation as described in Example 1 of U.S. Patent 3,086,912. Therefore, a source of lincomycin B is a lincomycin fermentation whole beer as disclosed in Example 1, of U.S. Patent 3,086,912.

The new compound of the invention is a nitrogenous base having the molecular formula $C_{17}H_{32}N_2O_6S$. It is monobasic, has a pKa' of about 7.46–7.68, and under ordinary conditions is more stable in the protonated, that is, salt form. It is soluble in lower-alkanols, e.g., methanol, ethanol, isopropanol, the butanols, and the like; lower-alkyl esters of lower-alkanoic acids, e.g., ethyl acetate, butyl acetate, amyl acetate, and the like; lower-alkanones, e.g., acetone, methyl ethyl ketone, isopropyl butyl ketone, and the like; and chlorinated lower-alkanes, e.g., methylene chloride, chloroform, ethylene dichloride, and the like. It has some solubility in water but can be extracted from aqueous solutions with with water-immiscible solvents, e.g., 1-butanol, butyl acetate, methylene chloride and the like.

Lincomycin B can be recovered from a lincomycin fermentation by employing the recovery procedures disclosed in U.S. Patent 3,086,912. A preferred method for the recovery of lincomycin B is to utilize surface active adsorbents, for example, decolorizing carbon or decolorizing resins, and eluting the adsorbed material with a solvent. Any of the solvents mentioned above can be used. A suitable decolorizing resin is Permutit DR (U.S. Patent 2,702,263). The whole beer is filtered as disclosed in U.S. Patent 3,086,912 before passage of the beer over the surface active adsorbent. The eluates are evaporated to dryness and the residue is extracted with water-immiscible solvent from which the new compound and lincomycin are recovered. Further procedures are necessary to effect a separation of lincomycin and lincomycin B. Preferred procedures are counter-current distribution and Florisil chromatography though others such as silica gel chromatography and partition column chromatography also can be used.

Fractional liquid-liquid extraction is accomplished in a counter-current distribution apparatus, using solvent systems such as cyclohexane-methyl ethyl ketone-pH 10 buffer (7:3:2) and 1-butanol-water (1:1) or on partition chromatographic columns.

Final purification is accomplished by converting the lincomycin B to a salt, advantageously the hydrochloride, and crystallizing the latter from essentially an acetone solution by the addition of ether.

The new compound of the invention can also be recovered from the filtered beer by adsorption on cation exchange resins. Both the carboxylic and sulfonic acid types can be used. (Suitable carboxylic acid resins include the polyacrylic acid resins obtained by the copolymerization of acrylic acid and divinylbenzene by the procedure given on page 87 of Kunin, Ion Exchange Resins, 2nd ed., (1958), John Wiley and Sons, Inc. Carboxylic acid cation exchange resins of this type are marketed under the tradenames Amberlite IRC–50, and Zeokarb 226. Suitable sulfonic acid resins include nuclear sulfonated polystyrene resins cross-linked with divinyl-benzene which are obtained by the procedure given on page 84 of Kunin, supra. Sulfonated cation exchange resins of this type are marketed under the tradenames Dowex 50, Amberlite IR–120, Nalcite HCR, Chempro C–20, Permutit Q, and Zeokarb 225.)

The antibiotic is eluted from the resin with an acid, advantageously at a pH lower than the pKa' of the cation exchange resin used. Satisfactory results are obtained with a pH of about 1 to 6. The eluate is adjusted to about pH 7.5 to 8.5 with a base, e.g., sodium hydroxide, or a strongly basic anion exchange resin. (Suitable anion exchange resins for this purpose are obtained by chloromethylating by the procedure given on pages 88 and 97 of Kunin, supra, polystyrene cross-linked, if desired, with divinylbenzene, prepared by the procedure given on page 84 of Kunin, supra, and quaternizing with trimethylamine or dimethylethanolamine by the procedure given on page 97 of Kunin, supra. Anion exchange resins of this type are marketed under the tradenames Dowex 2, Dowex 20, Amberlite IRA–400, Duolite A–102 and Permutit S–1.)

The novel compound of the invention can be purified by successive transfers from protonated to non-protonated forms and vice versa, especially with other types of treatments intervening, as for example, solvent extractions and washings, chromatography and fractional liquid-liquid extractions. In this manner salts of lincomycin B can be employed to isolate or upgrade the antibiotic. For example, the antibiotic can be converted to an insoluble salt, such as the picrate, which can be subjected to purification procedures and then used to regenerate the antibiotic free base by treatment with alkali; or the antibiotic can be converted to a water-soluble salt, such as the hydrochloride or sulfate, and the aqueous solution of the salt extracted wth various water-immiscible solvents before regenerating the antibiotic free base by treatment with alkali of the thus-extracted acid solution. Salts of lincomycin B can be used for the same biological purposes as the free base or they can be employed to upgrade the antibiotic as previously described.

Specific acid salts can be made by neutralizing the free base with the appropriate acid to below about pH 7.0, and advantageously to about pH 2 to pH 6. Suitable acids for this purpose include hydrochloric, sulfuric, phosphoric, acetic, succinic, citric, lactic, maleic, fumaric, palmoic, cholic, palmitic, mucic, camphoric, glutaric, glycolic, phthalic, tartaric, lauric, stearic, salicylic, 3-phenylsalicylic, 5-phenylsalicylic, 3-methylglutaric, ortho-sulfobenzoic, cyclohexanesulfamic, cyclopentanepropionic, 1,2-cyclohexanedicarboxylic, 4-cyclohexenecarboxylic, octadecenylsuccinc, octenylsuccinic, methanesulfonic, benzenesulfonic, helianthic, Reinecke's, dimethyldithiocarbamic, sorbic, monochloroacetic, undecylenic, 4'-hydroxyazobenzene-4-sulfonic, octadecylsulfuric, picric, benzoic, cinnamic, and like acids.

The new compound of the invention has the property of adversely affecting the growth of various organisms, particularly bacteria, and can be used either as the free base or as an acid addition salt, alone or in combination with other antibacterial agents, to prevent the growth of or to reduce the number of microorganisms present in various environments, for example, in plants and in animals, such as mammals, birds, fish, reptiles, and humans where the infecting microorganism is susceptible to the antibiotic. It can also be used as a feed supplement to promote the growth of animals, for example, mammals, birds, fish and reptiles. Lincomycin B inhibits the growth of *Staphylococcus aureus, Streptococcus lactis,* and *Streptococcus viridans.* Accordingly, the new compound can be used as a disinfectant for various dental and medical equipment contaminated with *Staphylococcus aureus;* it can also be used as a disinfectant for washed and stacked food utensils contaminated with this organism. Also, since lincomycin B is active against *Streptococcus lactis,* which causes the souring of milk, it can be used to prevent or delay the souring of dairy products, for example, milk and cheese. The new compound can also be used to inhibit the gram-positive sporeform spreaders on agar plates when isolating molds, yeasts, actinomycetes, and gram-negative organisms. It can be used, for example, in the isolation of organisms from soil samples as well as in the isolation of gram-negative organisms, for example, *Pseudomonas, Proteus,* and *Escherichia coli,* from mixed infections in the presence of staphylococci and/or streptococci. *Staphylococcus aureus* infected mice were protected orally with a $CD_{50}$ of 8.1 (4.0–12.2) mg./kg. of lincomycin B free base.

The following examples are illustrative of the process and products of the present invention but are not to be construed as limiting. All percentages are by weight and all solvent mixture proportions are by volume unless otherwise noted.

EXAMPLE 1

*Lincomycin B free base*

(A) *Recovery.*—The whole beer from a fermentation procedure as disclosed in Example 1, U.S. Patent 3,086,-912 (26,400 gal. assaying 572 mcg./ml.) was adjusted to pH 3.0 with 305 gal. of 60% sulfuric acid and filtered at 20° C. on a precoat filter using 5800 lbs. of diatomaceous earth as a precoat with no admix added to the whole beer. The filtered beer (24,000 gal. assaying 318 mcg./ml.) was adjusted to pH 8.0 with 50% sodium hydroxide solution, heated to 45° C., and pumped through a polishing filter press, a flowmeter and downflow through 5 carbon columns connected in series. Each carbon column contained 240 lbs. of 40 mesh granular carbon. The filtered beer was put through starting at 20 gal. per minute and ending at 10 gal. per minute. The carbon columns were then washed serially (forward) downflow with 1160 gallons of hot (50° C.) water at a rate of 4 gallons a minute. The columns were then blown dry and eluted in reverse series downflow with 200 gallons of 99% acetone at 40° C. at 3 gallons per minute followed by 2300 gallons of 75% aqueous actone at 50° C. at 2 gallons per minute. The acetone eluates were combined and concentrated under reduced pressure to an aqueous concentrate (80 gallons assaying 80,000 mcg./ml.). The aqueous concentrate was cooled to 28° C., adjusted to pH 10.6 with 1.5 gallons of 50% sodium hydroxide solution, and extracted with 80 gallons of methylene chloride. The aqueous concentrate was extracted five additional times with 20 gallons of methylene chloride each time. The methylene chloride extracts were filtered through 15 pounds of diatomaceous earth and concentrated to 20 gallons volume under vacuum. Deionized water (9.5 gallons) was added and concentration was continued to a 14 gallon volume. The concentrate was brought to a volume of 19 gallons by the addition of 5 gallons of deionized water, cooled at 28° C. and adjusted to pH 1.0 with 1.5 gallons of concentrated hydrochloric acid. Acetone (190 gallons) was added to the acidified aqueous solution and the mixture was cooled to 10° C. and stirred overnight; evaporation loss was 29 gallons. The solids were filtered on a 36 inch filter pot and washed with 8 gallons of 100% acetone; net weight of crude crystalline material was 30.75 kg. The 30.75 kg. were dissolved in 8.5 gallons of warm deionized water (1 liter/kg.) and filtered through 5 lbs. of diatomaceous earth. The filtrate was stirred with 85 gallons of warm (35° C.) acetone, the mixture was seeded with lincomycin crystals, and stirring was continued for 3 hours while cooling to 10° C. The crystals were filtered on a 36 inch filter pot, washed with 5 gallons of acetone, and dried under vacuum at 60° C. for 48 hours; yield, 24.3 kg. of lincomycin hydrochloride. The mother liquors and wash from the above crystallization steps were concentrated to an aqueous concentrate (13.2 liters), and one liter of this concentrate (ph 4.9) was adjusted to pH 9.5 by the addition of 2 N-sodium hydroxide solution, and extracted three times with 400 ml. of methylene chloride. The methylene chloride extract was concentrated to dryness to yield 85.0 grams of a mixture of lincomycin free base and lincomycin B free base.

(B) *Countercurrent distribution.*—Ten grams of this mixture of lincomycin and lincomycin B was dissolved in 75 ml. of the lower phase of a solvent system consisting of equal volumes of 1-butanol and water. The solution was adjusted to pH 4.2 by the addition of 1 N aqueous hydrochloric acid, mixed with an equal volume of the upper phase of the above-mentioned system, and transferred to an all-glass, Craig counter-current distribution (10 ml. per phase) apparatus. After 800 transfers the distribution was analyzed by solids determination and thin-layer chromatography. Analysis by thin-layer chromatography showed that tubes 60–90 contained lincomycin B, tubes 91–100 contained a mixture of lincomycin and lincomycin B, and tubes 101–160 contained lincomycin only. Tubes 60–90 were first concentrated and then freeze-dried; yield of lincomycin B, 960 mg.

(C) *Florisil chromatography.*—Lincomycin B (800 mg.) was dissolved in 30 ml. of water and the pH of the solution was adjusted to 10.5. After freeze-drying, the product was used as a starting material for the Florisil column described below. The column was prepared in the following manner: 40 g. of Florisil was added to a glass column (1 inch I.D.) containing Skellysolve B (isomeric hexanes) and was allowed to settle under atmospheric pressure. Sea sand was added to the top of the adsorbent bed, and the column was washed with two hold-up volumes of Skellysolve B (hold-up volume 70 ml.). The freeze-dried lincomycin B was dissolved in 20 ml. of acetone and filtered to remove 190 mg. of insoluble material. The filtered solution was added to the Florisil column, and the column was gradiently eluted first with Skellysolve B alone, then with Skellysolve B-acetone in proportions of 8:2, 6:4, 3:7, and 1:9, and finally with acetone alone. The eluate fractions were analyzed by solids determination and thin-layer chromatography. Fractions 5–18, which were found to contain lincomycin B, were combined, and the solvents were evaporated in vacuo to give 340 mg. of colorless, amorphous material assaying 249 mcg./mg. of lincomycin B free base. Upon concentration to dryness, fractions 19–28 afforded 50 mg. of lincomycin B free base which assayed 242 mcg./mg.

EXAMPLE 2

*Lincomycin B hydrochloride*

Lincomycin B free base, 100 mg., was dissolved in 0.7 ml. of 1 N aqueous hydrochloric acid. Addition of ethanol, acetone and ether resulted in the precipitation of semicrystalline lincomycin B hydrochloride which was separated by filtration and redissolved in 0.3 ml. of water and 10 ml. of acetone. Additional acetone (20 ml.) and 40 ml. of ether was added. The solution, which became cloudy, was allowed to stand at room temperature for 15 hours. Colorless crystalline lincomycin B hydrochloride was isolated by filtration and dried; yield, 60 mg. assaying 250 mcg./mg. The assays were obtained by testing preparations against *Sarcina lutea* on agar buffered to pH 6–8 with pH 7.0 phosphate buffer (0.1 M). A unit volume (0.08 ml.) of solution containing the material to be assayed is placed on a 12.7 mm. assay disc which is then placed on an agar plate seeded with the assay microorganism.

*Chemical and physical properties of lincomycin B free base*

Calculated for $C_{17}H_{32}N_2O_6S \cdot \frac{1}{2}H_2O$: C, 50.92; H, 8.30; N, 6.99; S, 8.00; O, 25.84. Found: C, 50.86; H, 8.48; N, 7.40; S, 8.13; O, 25.13 (by diff.).

*Specific optical rotation.*—$[\alpha]_D^{25}+153°$ (c.=0.8726, water).

*Solubility.*—Soluble in lower alcohols, acetone, ethyl acetate, chlorinated hydrocarbons, and dioxane. Less soluble in water, ether and benzene. Relatively insoluble in saturated hydrocarbon solvents.

*Molecular weight.*—Found: 402±10 by potentiometric titration.

*Ultraviolet spectrum.*—Lincomycin B free base shows no maxima between 220 and 400 mu.

*Titration.*—pKa' of about 7.68.

*Infrared spectrum.*—The infrared absorption spectrum of lincomycin B free base in Nujol mull is reproduced in FIGURE I of the drawing. Lincomycin B free base shows peaks at the following wavelengths expressed in reciprocal centimeters:

| | |
|---|---|
| 3340 (S) | 1185 (M) |
| 2920 (S) (oil) | 1158 (M) |
| 2850 (S) (oil) | 1078 (S) |
| 2780 (M) | 1051 (S) |
| 1645 (S) | 988 (M) |
| 1527 (S) | 945 (M) |
| 1457 (S) (oil) | 902 (M) |
| 1376 (S) (oil) | 863 (M) |
| 1343 (M) | 802 (M) |
| 1325 (M) | 778 (M) |
| 1305 (M) | 720 (M) (oil) |
| 1237 (M) | 692 (M) |
| 1215 (M) | |

*Paper chromatography.*—Lincomycin B free base has a characteristic papergram pattern as shown in FIGURE II of the drawing. The solvent systems employed were as follows:

(I) 1-butanol, water (84:16); 16 hours.
(II) 1-butanol, water (84:16) plus 0.25% p-toluenesulfonic acid; 16 hours.
(III) 1-butanol, acetic acid, water (2:1:1); 16 hours.
(IV) 2% piperidine (v./v.) n-butanol, water (84:16);
(V) 1-butanol, water (4:96); 5 hours.
(VI) 1-butanol, water (4:96) plus 0.25% p-toluenesulfonic acid; 5 hours.

*Chemical and physical properties of lincomycin B hydrochloride*

Calculated for $C_{17}H_{32}N_2SO_6 \cdot HCl \cdot \frac{1}{2}H_2O$: Found: C, 46.77; H, 8.03; N, 6.36; S, 7.46; Cl, 7.98; O, 23.40 (by diff.).

*Specific optical rotation.*—$[\alpha]_D^{25}+147.5°$ (c. 1, water).

*Solubility.*—Soluble in lower alcohols. Slightly soluble in less polar solvents. Relatively insoluble in ether, benzene, chlorinated hydrocarbon and saturated hydrocarbon solvents.

*Molecular weight.*—446.5 (calc.).

*Ultraviolet spectrum.*—Lincomycin B hydrochloride shows no maxima between 220 and 400 mu.

*Infrared spectrum.*—The infrared absorption spectrum of lincomycin B hydrochloride in Nujol mull is reproduced in FIGURE III of the drawing. Lincomycin B hydrochloride shows peaks at the following wavelengths expressed in reciprocal centimeters:

| | |
|---|---|
| 3470 (sh) | 1205 (W) |
| 3360 (S) | 1160 (W) |
| 3240 (S) | 1145 (W) |
| 3180 (S) | 1125 (W) |
| 3090 (M) | 1100 (S) |
| 1690 (S) | 1085 (S) |
| 1680 (S) | 1050 (S) |
| 1590 (M) | 980 (M) |
| 1580 (M) | 905 (W) |
| 1305 (W) | 875 (M) |
| 1270 (W) | 795 (M) |
| 1235 (W) | |

Band intensities as indicated in the above IR spectra are referred to as "S," "M," and "W." They are approximated in terms of the backgrounds in the vicinity of the bands, an "S" band is of the same order of intensity as the strongest band in the spectrum; "M" and "W" bands, respectively, are between ⅓ and ⅔ as intense as the strongest band, and less than ⅓ as intense as the strongest band. These estimates are made on the basis of a percent transmission scale.

*In vivo activity.*—*S. aureus* infected mice, treated orally, were protected with a $CD_{50}$ of 13.9 (5.1–22.3) mg./kg. dose of lincomycin B hydrochloride.

We claim:

1. A composition of matter substantially free from lincomycin, lincomycin B, a compound which
   (a) is effective in inhibiting the growth of various gram-positive bacteria;
   (b) is soluble in lower alcohols, acetone, ethyl acetate, chlorinated hydrocarbons, and dioxane; less soluble in water, ether and benzene; and relatively insoluble in saturated hydrocarbon solvents;
and which in its essentially pure free base form
   (c) has the following elemental analysis: C, 50.86; H, 8.48; N, 7.40; S, 8.13; O, 25.13 (by diff.);
   (d) has a molecular weight of 402±10 by potentiometric titration;
   (e) shows no ultraviolet absorption maxima between 220 and 400 mu;
   (f) has a characteristic infrared absorption spectrum as shown in FIGURE I of the accompanying drawings; and (g) has a characteristic papergram pattern as shown in FIGURE II of the drawing.

2. A compound selected from the group consisting of lincomycin B, according to claim 1, and acid addition salts thereof.

3. The hydrochloride of the compound as defined in claim 1 having a characteristic infrared absorption spectrum as shown in FIGURE III of the accompanying drawing.

4. A process which comprises cultivating *Streptomyces lincolnensis* var. *lincolnensis* in an aqueous nutrient medium under aerobic conditions until substantial antibacterial activity is imparted to said medium by production of lincomycin and lincomycin B, separating lincomycin B from lincomycin, and isolating the lincomycin B.

5. A process which comprises cultivating *Streptomyces lincolnensis* var. *lincolnensis* in an aqueous nutrient medium containing a source of assimilable carbohydrate and assimilable nitrogen under aerobic conditions until substantial antibacterial activity is imparted to said medium by production of lincomycin and lincomycin B, separating lincomycin B from lincomycin, and isolating the lincomycin B.

6. A process according to claim 5 in which the separation comprises subjecting a mixture of lincomycin and lincomycin B to fractional liquid-liquid extraction using a solvent system consisting of equal volumes of 1-butanol and water.

7. A compound according to claim 3 in its essentially pure crystalline form.

References Cited
UNITED STATES PATENTS
3,086,912  4/1963  Bergy et al. _____ 167—65

ALBERT T. MEYERS, *Primary Examiner.*

D. M. STEPHENS, *Assistant Examiner.*